United States Patent [19]

Drake et al.

[11] 4,198,488

[45] Apr. 15, 1980

[54] POLYMER-POLYOLS AND POLYURETHANES BASED THEREON

[75] Inventors: Kenneth Drake, Charleston; Kenneth L. Hoy; Carl G. Seefried, Jr., both of Saint Albans, all of W. Va.

[73] Assignee: Union Carbide Corporation, New York, N.Y.

[21] Appl. No.: 919,064

[22] Filed: Jun. 26, 1978

[51] Int. Cl.$^2$ .................... C08G 18/14; C08G 18/63; C08K 5/06

[52] U.S. Cl. .................... 521/137; 521/179; 260/33.4 R; 528/75; 528/73

[58] Field of Search .................. 521/137, 179; 528/75; 260/33.4 R

[56] References Cited

U.S. PATENT DOCUMENTS

| | | | |
|---|---|---|---|
| 3,304,273 | 2/1967 | Stamberger | 521/137 |
| 3,383,351 | 5/1968 | Stamberger | 521/137 |
| 3,523,093 | 8/1970 | Stamberger | 521/137 |
| 3,652,639 | 3/1972 | Pizzini et al. | 521/137 |
| 3,823,201 | 7/1974 | Pizzini et al. | 521/137 |
| 3,850,861 | 11/1974 | Fabris et al. | 521/137 |
| 3,966,521 | 6/1976 | Patton et al. | 521/137 |
| 4,119,586 | 10/1978 | Shah | 521/137 |

OTHER PUBLICATIONS

Kuryla et al., Polymer Polyols, Jour. Cellular Plastics, Mar. 1966, pp. 1-3.

*Primary Examiner*—H. S. Cockeram
*Attorney, Agent, or Firm*—Eugene C. Trautlein

[57] ABSTRACT

Fluid, stable polymer-polyols are provided which consist of an organic polyol medium and an interpolymer of a minor amount of polymerized ethylenically unsaturated dicarboxylic acid anhydride, such as maleic acid anhydride, and a major amount of at least one different polymerized ethylenically unsaturated monomer, the interpolymer being in the form of particles that are stably dispersed in the polyol. Polyurethane foams produced from these polymer/polyols display improved load bearing and compression set when compared with polymer/polyols produced in a similar manner without the ethylenically unsaturated dicarboxylic acid anhydride; elastomers so produced have improved tensile modulus and tear properties.

19 Claims, No Drawings

POLYMER-POLYOLS AND POLYURETHANES BASED THEREON

RELATED APPLICATIONS

Priest, Ser. No. 417,787, filed: Nov. 20, 1973, for: Polymer/Polyols and Process for Production Thereof; a continuation-in-part of Ser. No. 176,317, filed: Aug. 30, 1971.

Simroth, Ser. No. 593,164, filed: July 3, 1975, for: Liquid Polymer/Polyols and Polyurethane Elastomers Based Thereon; a continuation-in-part of Ser. No. 501,362, filed Aug. 28, 1974.

Van Cleve et al., Ser. No. 594,649, filed: July 10, 1975, for: Polymer/Polyols and Process for Production Thereof.

BACKGROUND OF THE INVENTION

Polymer/polyol compositions suitable for use in producing polyurethane foams, elastomers and the like are known materials. The basic patents in this field are U.S. Pat. Nos. 3,304,273, 3,383,351, U.S. Pat. No. Re. 28,715 and U.S. Pat. No. Re. 29,118 to Stamberger. Such compositions can be produced by polymerizing one or more olefinically unsaturated monomers dissolved or dispersed in a polyol in the presence of a free radical catalyst. Many Examples in the Stamberger patents utilize various carboxylic acids in the monomer mixtures; and, more particularly, itaconic acid is used by itself and as a co-monomer present as a minor constituent based on the total weight of the monomer mixture. These polymer/polyol compositions have the valuable property of imparting to, for example, polyurethane foams and elastomers produced therefrom, higher load-bearing properties than are provided by unmodified polyols.

In addition, U.S. Pat. No. 3,523,093 to Stamberger discloses a method for preparing polyurethanes by reacting a polyisocyanate with a mixture of a polyol solvent medium and a preformed normally solid film-forming polymeric material obtained by polymerization of ethylenically unsaturated monomers. The film-forming polymer may be prepared by various techniques, including polymerizing the monomers in the presence of reactive radial-containing compounds such as alcohols and mercaptans.

The polymer/polyol compositions that found initial commercial acceptance were primarily compositions produced from polyols and acrylonitrile. Such compositions were somewhat higher in viscosity than desired in some applications. Further, such compositions were at least primarily used commercially in producing foams under conditions such that the heat generated during foaming is readily dissipated (e.g.—the foams are a relatively thin cross-section) or under conditions such that relatively little heat is generated during foaming. When polyurethane foams were produced under conditions such that the heat generated during foaming was not readily dissipated, severe foam scorching usually resulted. Later polymer/polyol compositions produced from acrylonitrile-methylmethacrylate mixtures were commercialized and were convertible to polyurethane foams having reduced scorch.

More recently, polymer/polyol compositions produced from polyols and acrylonitrile or acrylonitrile-styrene mixtures have been used commercially. The co-pending Priest application identified herein provides an improved process for forming such polymer/polyols which includes, in general, maintaining a low monomer concentration throughout the reaction mixture during the process. The novel polymer/polyols produced have low viscosities, also the Priest polymer/polyols can be converted to low density, water-blown polyurethane foams having reduced scorch, especially at relatively low acrylonitrile to styrene ratios. However, the stability of the polymer/polyols decreases with increasing styrene-to-acrylonitrile ratios. Further, the discoloration (scorch) of the resulting foams still presents some problems, particularly when the polymer composition contains a relatively high acrylonitrile-to-styrene ratio.

Still further, the co-pending Simroth application which has been identified discloses additional and substantial improvements in forming polymer/polyols. This allows the optimization of the polymer content and the usable monomer ratios for a given polyol in providing satisfactory stable polymer/polyols.

The previously identified Van Cleve et al. application discloses further improvements in the formation of polymer/polyols. As discussed therein, polymer/polyol compositions exhibiting outstanding properties can be made by utilizing, in the formation of the polymer/polyols, a specific type of peroxide catalyst, namely t-alkyl peroxyester catalysts. By the utilization of this specific type of catalyst, polymer/polyols can be produced on a commercial basis with outstanding properties such as filterability in processing, yet which allow either the polymer or the styrene content to be increased. Also, polymer/polyols can be produced on a commercial scale with polyols having a molecular weight lower than have been used prior to this invention.

Despite these improvements, there is still room for further refinement. Commercial production thus requires that the resulting polymer/polyols have relatively low viscosities so that processing in the production equipment can be economically carried out. Further, the stability resulting must be sufficient to allow operation without plugging or fouling of the reactors as well as allowing for relatively long term storage.

The polymer/polyols must also be capable of being processed in the sophisticated foam equipment presently being used. Typically, the prime requirement is that the polymer/polyols possess sufficiently small particles so that filters, pumps and the like do not become plugged or fouled in relatively short periods of time.

While somewhat simplified, the commercial processability of a particular polymer/polyol comes down to its viscosity and stability against phase separation. Lower viscosities are of substantial practical and economic significance due to the ease of pumping and metering as well as ease of mixing during the formation of polyurethanes. Stability is of prime consideration in insuring that the polymer/polyols can be processed in commercial production equipment without the necessity of additional mixing to insure homogeneity.

Accordingly, any improvements which impart more desirable properties to the resulting polyurethanes without increasing viscosity or stability problems would be favorably received. Unfortunately, it has been the experience that increased load-bearing in foams and modulus in elastomers are usually associated with increased viscosity in the polymer/polyol.

It has been theorized that the stability of polymer/polyols requires the presence of a minor amount of a graft copolymer formed from the polymer and polyol. And, a number of literature references have observed large differences in grafting efficiency between the use of peroxides such as benzoyl peroxide and azo-bis-isobutyronitrile in certain monomer-polymer systems while others have noted no marked differences.

In the *Journal of Cellular Plastics,* March, 1966, entitled "Polymer/Polyols; A New Class of Polyurethane Intermediates" by Kuryla et al., there is reported a series of precipitation experiments run to determine any marked differences in the polymer/polyols produced by either benzoyl peroxide or azo-bis-isobutronitrile when used as the initiators in the in situ polymerization of acrylonitrile in a poly(oxypropylene)triol having a theoretical number average molecular weight of about 3000. The data indicated no significant differences between the polymers isolated, and no marked "initiator effect" was observed.

With regard to addition copolymer stabilizers, efforts in the polymer/polyol field have been concerned with the incorporation of additional amounts of unsaturation to that inherently present in the polyoxyalkylene polyols typically used in forming polymer/polyols. U.S. Pats. Nos. 3,652,639 and 3,323,201 and U.S. Pat. No. 3,850,861 all utilize this approach. The theory is presumably that increased amounts of the stabilizing species will be formed by addition polymerization upon polymerizing whatever ethylenically unsaturated monomers are employed in such polyols.

U.S. Pat. No. 3,850,861 thus discloses the in situ polymerization of ethylenically unsaturated monomers in an unsaturated polyol. Suitable unsaturated polyols are prepared by using an ethylenically unsaturated mono- or polyhydric initiator to form a polyalkylene oxide. The examples set forth include dibasic acids or their derivatives, such as maleic acid. The polyol polymerization medium thus contains one mole of unsaturation per mole of polyol.

U.S. Pat. No. 3,652,639 likewise discloses the in situ polymerization of ethylenically unsaturated monomers in an ethylenically unsaturated polyol medium. The unsaturated polyols of this patent are produced in a manner similar to those of U.S. Pat. No. 3,323,201, as will be discussed hereinafter, except that the level of unsaturation is higher, being on the order of 1 to 3 moles of unsaturation per mole of polyol.

U.S. Pat. No. 3,323,201 discloses a method of preparing a polymer/polyol by the in situ polymerization of ethylenically unsaturated monomers in a polyol having from 0.1 to 0.7 mole of unsaturation per mole of polyol. Unsaturation at the levels set forth in the U.S. Pat. No. 3,652,639 patent were indicated as imparting unnecessarily high viscosities to the resulting polymer/polyols. The unsaturation level that is added can be introduced into the polyol by reacting it with an ethylenically unsaturated compound that is capable of adding to the polyol by reaction with the hydroxyl group, such as maleic anhydride. The polymer/polyols disclosed in U.S. Pat. No. 3,823,201 are asserted to be highly stable due to the presence of the stabilizing species which is formed via the grafting of vinyl polymer chain segments to the unsaturated polyol molecules. Certain improvements in polyurethanes using such polymer/polyols are likewise asserted. More particularly, it is stated that such polymer/polyols are surprisingly superior to those prepared from polyols having high unsaturation in regard to their low viscosities. It is further alleged that polyurethane foams prepared from these graft copolymers exhibit superior load-bearing properties.

A prime difficulty with incorporating additional unsaturation into the polyols such as by the techniques set forth in U.S. Pat. No. 3,652,639 is that an additional step is required and/or processing is made more difficult. The use of maleic anhydride to introduce the additional unsaturation requires an additional step. Moreover, improvements in properties of polyurethanes do not necessarily result; and undesirable increases in viscosity of the polymer/polyol can result.

SUMMARY OF THE INVENTION

The present invention thus provides novel, improved, highly stable polymer/polyols and methods for their preparation as well as polyurethane products made therefrom. In general, this invention is based on the discovery that when a minor amount of an ethylenically unsaturated dicarboxylic acid anhydride is incorporated with other ethylenically unsaturated monomers to form a monomer mixture which is polymerized in situ in a polyol medium, the resulting polymer/polyols will impart improved properties to polyurethane products made therefrom. More specifically, polyurethane foams so produced have compression set and load-bearing properties superior to those of foams based on similar polymer/polyols produced without the use of the ethylenically unsaturated dicarboxylic acid anhydride in the monomer mixture. Polyurethane elastomers made according to this invention exhibit improved tensile modulus and tear properties. In view of the experience of the prior art that increasing load-bearing properties are usually associated with increased viscosity in the polymer/polyol, it is surprising that the polymer/polyols of the present invention display viscosities on the same order as, and in some instances even lower than, the viscosities of comparable polymer/polyols not employing the ethylenically unsaturated dicarboxylic acid component of the monomer mixture. In most instances, the seed content of the polymer/polyols of this invention, measured as mg. of 150 mesh seeds/100 g. of polymer/polyol, which is considered to be one measure of stability, is not significantly higher than the seed content of comparable polymer/polyols not employing the ethylenically unsaturated dicarboxylic acid anhydride component.

It is believed that the novel polymer/polyols of this invention comprise a dispersion of an interpolymer of an ethylenically unsaturated dicarboxylic acid anhydride and at least one other ethylenically unsaturated monomer in an organic polyol medium in which there is also present some graft copolymer produced when a portion of the ethylenically unsaturated dicarboxylic acid anhydride units, which have polymerized into the polymer backbone, undergo a reaction with the hydroxyl groups of the polyol. It is further theorized that the graft copolymer species acts as a stabilizer for the polymer dispersion as well as providing a means by which the polymer particles form a bond to the polyurethane formed when the polymer/polyol is reacted with a polyisocyanate.

DETAILED DESCRIPTION OF THE INVENTION

The novel improved polymer/polyols of this invention comprise fluid, stable polymer/polyols of: (1) from about 60 to about 90 weight percent of an organic polyol medium consisting essentially of at least one normally liquid polyol and (2) from about 10 to about 40 weight percent of an interpolymer of (a) a minor amount of polymerized ethylenically unsaturated dicarboxylic acid anhydride and (b) a major amount of at least one different polymerized ethylenically unsaturated monomer, the interpolymer being in the form of particles that are stably dispersed in the polyol and the weight percents being based on the total weight of the polymer and polyol.

The organic polyols useful in this invention are well known compounds. Functionally useful polyols should be liquid at room temperature and act as dispersing media for the polymers formed by the in situ polymerization of the mixture of ethylenically unsaturated monomers therein.

The preferred organic polyols are the propylene oxide adducts of mono-, di-, tri-; or polyhydroxy alkanes. Such polyols include poly(oxypropylene) polyols which may also have oxyethylene present; however, desirably, the oxyethylene content should comprise less than about 50 percent of the total and, preferably, less than about 20 percent, when the polymer/polyols are to be used in forming polyurethane foams. The oxyethylene units can be incorporated in any fashion along the polymer chain. Stated another way, the oxyethylene units can either be incorporated in internal blocks, as terminal blocks, or may be randomly distributed along the polymer chain. As is known in the art, the preferred polyols do normally contain varying amounts of unsaturation. The extent of unsaturation typically involved does not affect in any adverse way the formation of the polymer/polyols in accordance with the present invention.

For the purposes of this invention, useful polyols should have a number average molecular weight of about 400 or greater, the number average used herein being the value derived from the hydroxyl number and the theoretical hydroxyl functionality. The true number average molecular weight may be somewhat less, depending upon the extent to which the true molecular functionality is below the starting or theoretical functionality.

The polyols employed can have hydroxyl numbers which vary over a wide range. In general, the hydroxyl numbers of the polyols employed in the invention can range from about 20 and lower, to about 280 and higher. The hydroxyl number is defined as the number of milligrams of potassium hydroxide required for the complete hydrolysis of the fully phthalylated derivative prepared from 1 gram of polyol. The hydroxyl number can also be defined by the equation:

$$OH = 56.1 \times 1000 \times f/m.w.$$

where
OH = hydroxyl number of the polyol
f = functionality, that is, average number of hydroxyl groups per molecule of polyol
m.w. = molecular weight of the polyol.

The exact polyol employed depends upon the end use of the polyurethane product to be produced. The molecular weight or the hydroxyl number is selected properly to result in flexible or semi-flexible foams or elastomers when the polymer-polyol produced from the polyol is converted to a polyurethane. The polyols preferably possess a hydroxyl number of from about 50 to about 150 for semi-flexible foams and from about 20 to about 70 for flexible foams. Such limits are not intended to be restrictive, but are merely illustrative of the large number of possible combinations of the above polyol coreactants.

As alternatives to the preferred poly(oxypropylene) polyols, any other type of know polyol may also be used. Among the polyols which can be employed are one or more polyols from the following classes of compositions, known to those skilled in the polyurethane art:

(a) Alkylene oxide adducts of non-reducing sugars and sugar derivatives;
(b) Alkylene oxide adducts of phosphorus and polyphosphorus acids;
(c) Alkylene oxide adducts of polyphenols;
(d) The polyols from natural oils such as castor oil, and the like:
(e) Alkylene oxide adducts of polyhydroxyalkanes other than those already described herein,
(f) Polyester polyols;
(g) Alylene oxide adducts of primary or secondary amines such as ethylene diamine, diethylene triamine, etc.

Illustrative alkylene oxide adducts of polyhydroxyalkanes include, among others, the alkylene oxide adducts of 1, 3-dihydroxypropane, 1, 3-dihydroxybutane, 1,4-dihydroxybutane, 1,4-, 1,5- and 1,6-dihydroxyhexane, 1,2-, 1,3-, 1,4-, 1,6-, and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

A further class of polyols which can be employed are the alkylene oxide adducts of the non-reducing sugars, wherein the alkylene oxides have from 2 to 4 carbon atoms. Among the non-reducing sugars and sugar derivatives contemplated are sucrose, alkyl glycosides such as methyl glucoside, ethyl glucoside, and the like, glycol glycosides such as ethylene glycol glucoside, propylene glycol glucoside, glycerol glucoside, 1,2,6-hexanetriol glucoside, and the like, as well as the alkylene oxide adducts of the alkyl glycosies as set forth in U.S. Pat. No. 3,073,788.

A still further useful class of polyol is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, the novalac resins; condensation products of various phenolic compounds and acrolein; the simplest members of this class being the 1,1,3-tris(hydroxyphenyl) propanes, condensation products of various phenolic compounds and glyoxal, glutaraldehyde, and other dialdehydes, the simplest members of this class being the 1,1,2,2-tetrakis(hydroxyphenol)-ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

One can mention, as illustrative of the useful polyester polyols, those produced by polymerizing a lactone monomer in the presence of a polyhydric initiator. Suitable lactone monomers have the formula:

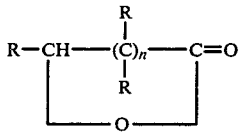

wherein n is an integer having a value of from about 3 to about 6, at least n+2 R's are hydrogen and the remaining R's are each lower alkyl (1-3 carbons). As illustrative of suitable lactone monomers one can mention epsiloncaprolactone; delta-valerolactone; zeta-enantholactone; the monoalkyl-delta-valerolactones; e.g., the monomethyl-, monethyl-, monohexyl- delta-valerolactones, and the like; the dialkyl-delta-valerolactones, e.g., the dimethyl-, diethyl-, and di-n-octyl-delta-valerolactones, and the like; the monoalkyl-, dialkyl-, and trialkyl-epsiloncaprolactones, e.g. the monomethyl-, monoethyl-, monohexyl-, dimethyl-, diethyl-, di-n-propyl-, di-n-hexyl-, trimethyl-, triethyl-, tri-n-propyl-epsilon-caprolactones, and the like. The suitable polyhydric initiators are well known and include, for example, glycerol, trimethylolethane, trimethylolpropane, diethylene glycol; 1,2,4-butanetriol, 1,2,6-hexanetriol, pentaerythritol, neopentyl glycol, 1,4-butanediol, 3'-hydroxy-2',2'-dimethylpropyl 3-hydroxy-2,2-dimethylpropionate, and the like.

The polyols described above are listed as merely illustrative of those which are useful in this invention and any known organic polyol or mixture of such polyols is suitable.

The mixture of ethylenically unsaturated monomers which is polymerized in situ in the organic polyol medium has two components. The first component is the ethylenically unsaturated dicarboxylic acid anhydride, maleic anhydride being preferred. Other illustrative examples of useful materials are the anhydrides of itaconic, propenyl succinic, citraconic, mesaconic, cyclohexene dicarboxylic, and endomethylene cyclohexene dicarboxylic acids, and the like.

Conceptually, compounds other than anhydrides may be employed. To be useful, the compound must contain unsaturation so as to be capable of interpolymerizing with the ethylenically unsaturated monomer or monomers used. Still further, the compound must contain a functional group that is reactive with the hydroxyl groups of the polyol employed.

The component should be present, in theory, in a minor amount since the basis for inclusion is to provide property improvements in polymer/polyols formed from other types of ethylenically unsaturated monomers. As far as a minimum is concerned, a sufficient amount should be utilized to provide the desired product improvements. In this connection, an amount as small as 0.5 percent, based on the total weight of the monomer mixture, may prove satisfactory in some applications. On the other hand, increasing amounts of the anhydride component will result in increasing acid numbers for the polymer/polyols so formed. This is undesirable in foam applications since either reformulations (from those conventionally used) are needed to avoid foam collapse or some other modification may be undertaken to reduce the acid number. Thus, acid numbers in excess of about 1.5 mg. KOH/g. are typically considered undesirable. Further, and importantly, the amount need be no more than that required to provide the desired property improvement. For these reasons, the maximum amount desirably used will typically be no more than 10 weight percent, although some applications may find amounts up to 20 weight percent even more useful. The preferred range is accordingly from about 0.5 to 20 weight percent, more preferably 0.5 to 10, and even more preferably, 2.5 to 6.

The other component in the ethylenically unsaturated monomer mixture is considerably broader in its scope than the anhydride component. It is necessary only that the monomer have at least one polymerizable >C=C< group and be compatible with the organic polyol medium. It is preferred that this monomer contain no radicals which are reactive with the organic polyol under the processing conditions of this invention, e.g., oxirane, oxetane, isocyanate, etc. These ethylenically unsaturated monomers can be employed singly or in combinations.

Acrylonitrile or mixtures thereof with a comonomer such as styrene are commonly used in preparing polymer/polyols. What acrylonitrile/styrene ratios are used, or indeed whether other monomers are used, will be dependent upon factors such as the type of properties required as well as ease in processability in preparing the polymer/polyols.

Other suitable ethylenically unsaturated monomers that can be employed include butadiene, isoprene, 1,4-pentadiene, 1,6-hexadiene, 1,7-octadiene, alphamethylstyrene, methylstyrene, 2,4-dimethylstyrene, ethylstyrene, isopropylstyrene, butylstyrene, phenylstyrene, cyclohexylstyrene, benzylstyrene, and the like, substituted styrenes such as chlorostyrene, 2,5-dichlorostyrene, bromostyrene, fluorostyrene, trifluoromethylstyrene, iodostyrene, cyanostyrene, nitrosostyrene. N,N-dimethyl-aminostyrene, acetoxystyrene, methyl 4-vinylbenzoate, phenoxystyrene, p-vinyl diphenyl sulfide, p-vinylphenyl phenyl oxide, and the like; the acrylic and substituted acrylic monomers such as acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl alpha-chloracrylate, ethyl alpha-ethoxyacrylate, methyl alpha-acetaminoacrylate, butyl acrylate, 2-ethylhexyl acrylate, phenyl acrylate, phenyl methacrylate, alpha-chloroacrylonitrile, N,N-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl butyrate, isopropenyl acetate, vinyl formate, vinyl acrylate, vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N-vinylpyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate, dimethyl maleate, maleic acid, crotonic acid, fumaric acid, itaconic acid, monomethyl itaconate, t-butylaminoethyl methacrylate, dimethylaminoethyl methacrylate, allyl alcohol, glycol monoesters of itaconic acid, dichlorobutadiene, vinyl pyridine, and the like. Any of the known polymerizable monomers can be used, and the compounds listed above are illustrative and not restrictive of the monomers suitable for use in this invention.

The total weight of the monomer mixture used is desirably in the range of from about 10 to about 40 weight percent, based on the total weight of the mixture and the polyol. The amount would be reduced to perhaps 5 weight percent or so, but process efficiency would be greatly reduced. On the other hand, amounts up to 50 weight percent might be used, if desired. The weight of the monomer mixture can generally be equated to the weight of the resulting polymer since conversions often approach 100 percent. However, the weight of the monomer mixture used can certainly be increased as needed to provide whatever polymer content is desired in those situations where conversions of monomer to polymer is substantially less than 100 percent.

The improved polymer/polyols are produced by polymerizing the mixture of ethylenically unsaturated monomers in the organic polyol medium at a temperature of from about 100° C. to 150° C., preferably from 115° C. to 125° C. in the presence of a catalytically effective amount of a conventional free radial catalyst known to be suitable for the polymerization of ethylenically unsaturated monomers.

The polymer/polyols of the present invention are preferably produced by utilizing the process set forth in the copending U.S. patent application by Priest, previously identified herein. In accordance with that process, a low monomer to polyol ratio is maintained throughout the reaction mixture during the process. This is achieved by employing conditions that provide rapid conversion of monomer to polymer. In practice, a low monomer to polyol ratio is maintained, in the case of semi-batch and continuous operation, by control of the temperature and mixing conditions and, in the case of semi-batch operation, also by slowly adding the monomers to the polyol.

The mixing conditions employed are those obtained using a back mixed reactor (e.g.—a stirred flask or stirred autoclave). The reactors of this type keep the reaction mixture relatively homogeneous and so prevent localized high monomer to polyol ratios such as occur in certain tubular reactors, e.g.—in the first stages of "Marco" reactors when such reactors are operated with all the monomer added to the first stage.

The utilization of the Priest process is preferred since this allows the preparation of polymer/polyols with a wide range of monomer compositions, polymer contents and polyols that could not be otherwise prepared with the necessary requisite stability. However, whether the utilization of the Priest process is essential depends upon whether the process parameters are such that a satisfactory polymer/polyol can be prepared without using this process.

In the case of continuous or semi-batch production of the polymer/polyol, the relative proportions of monomers in the monomer mixture feed stream (i.e., ethylenically unsaturated dicarboxylic acid anhydride and other ethylenically unsaturated monomer or monomers) can be constant throughout the reaction or may be varied during the reaction, provided only that the total amounts of the anhydride and other ethylenically unsaturated monomers fed to the reactor during the reaction are within the proportional range set forth above. For example, the proportion of the anhydride in relation to the other ethylenically unsaturated monomers in the feed stream may remain constant at the desired overall concentration or it may be less than the desired overall concentration during the initial stages of the reaction and gradually increased to greater than the desired overall concentration during the final stages. Methods for varying the relative monomer concentrations in the feed stream are known and described in U.S. Pat. No. 3,804,881.

The concentration of the catalyst can vary from about 0.001 to about 5 percent, preferably from about 0.2 to about 0.5 percent; however, any effective catalytic amount is satisfactory. Illustrative catalysts are the well-known free radical type of vinyl polymerization catalysts, for example, the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, diacetyl peroxide, di-alpha-cumyl peroxide, dipropyl peroxide, diisopropyl peroxide, isopropyl t-butyl peroxide, butyl t-butyl peroxide, dilauroyl peroxide, difuroyl peroxide, ditriphenylmethyl peroxide, bis(p-methoxy-benzoyl) peroxide, rubrene peroxide, ascaridol, t-butyl peroxybenzoate, t-butyl peroctoate, diethyl peroxyterephthalate, propyl hydroperoxide, isopropyl hydroperoxide, n-butyl hydroperoxide, t-butyl hydroperoxide, cyclohexyl hydroperoxide, transdecalin hydroperoxide, alpha-methylbenzyl hydroperoxide, tetralin hydroperoxide, triphenylmethyl hydroperoxide, diphenylmethyl hydroperoxide, 2,2'-azo-bis (2-methylbutyronitrile), 2,2'-azo-bis(2-methylheptonitrile), 1,1'-azo-bis(1-cyclohexane carbonitrile), dimethyl alpha,aklpha'-azo-isobutyrate, 4,4'-azo-bis(4-cyanopentanoic acid), azo-bisisobutyronitrile, persuccinic acid, diisopropyl peroxy dicarbonate, and the like. A mixture of catalysts may also be used.

The temperature and catalyst are chosen such that the catalyst has a satisfactory half-life at the temperature employed; preferably, the half life should be about 25 percent or less of the residence time in the reactor at the given temperature.

The polymerization can also be carried out with an inert organic solvent present. Illustrative thereof are toluene, benzene, acetonitrile, ethyl acetate, hexane, heptane, dicyclohexane, dioxane, acetone, N,N-dimethylformamide, N,N-dimethylacetamide, and the like, including those known in the art as being suitable solvents for the polymerization of vinyl monomers. The only requirement in the selection of the inert solvent is that it does not interfere with the polymerization reaction. When an inert organic solvent is used, it is preferably removed by conventional means.

If desired, the improved polymer/polyols of this invention can be diluted prior to their use in the production of polyurethanes by adding thereto additional organic polyol.

The seeds level of the resulting polymer/polyol, as determined by the test described hereinafter, should be kept as low as possible. Preferably, the 150 mesh seeds should be no more than about 20 mg/100 g of polymer/polyol. Seed levels of 5 mg/100 g of polymer/polyol or even less are, of course, more preferred.

This invention also provides novel polyurethane products which are produced by reacting: (a) a polymer/polyol composition of this invention, (b) an organic polyisocyanate, and (c) a catalyst for the reaction of (a) and (b) to produce the polyurethane product, and, when a foam is being prepared, a blowing agent and a foam stabilizer. When the polyurethane is a solid or microcellular elastomer, the reaction mixture can also contain chain extenders. The reaction and foaming operations can be performed in any suitable manner, preferably by the one-shot technique.

The organic polyisocyanates that are useful in producing polyurethanes in accordance with this invention are organic compounds that contain at least two isocyanato groups. Such compounds are well known in the art of producing polyurethane foams. Suitable organic polyisocyanates include the hydrocarbon diisocyanates, (e.g., the alkylene diisocyanates and the arylene diisocyanates) as well as known triisocyanates and polymethylene poly(phenylene isocyanates). As examples of suitable polyisocyanates are 1,2-diisocyanatoethane, 1,4-diisocyanatobutane, 2,4-diisocyanatotoluene, 2,6-diisocyanatotoluene, 1,3-diisocyanato-o-oxylene, 1,3-diisocyanato-m-xylene, 1,3-diisocyanto-p-xylene, 2,4-diisocyanato-1-chlorobenzene, 2,4-diisocyanato-1-nitrobenzene, 2,5-diisocyanato-1-nitrobenzene, 4,4'-diphenylmethylene diisocyanate; 3,3'-diphenylmethylene diisocyanate; and polymethylene poly-(phenyleneisocyanates) having the formula:

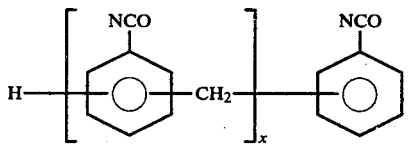

wherein x has an average value from 1.1 to 5 inclusive (preferably from 1.3 to 3.0).

The catalysts that are useful in producing polyurethanes in accordance with this invention include: tertiary amines such as bis(dimethylamino ethyl) ether, trimethylamine, triethylamine, N-methylmorpholine, N-ethylmorpholine, N,N-dimethylethanolamine, N,N,N',N'-tetramethyl-1,3-butane-diamine, triethanolamine, 1,4-diazabicyclo[2.2.2]octane, pyridine oxide and the like, and organotin compounds such as dialkyl-tin salts of carboxylic acids, e.g. dibutyltin diacetate, dibutyltin dilaurate, dibutyltin maleate, dilauryltin diacetate, dioctyltin diacetate, and the like. Stannous octoate is likewise a useful catalyst. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, bibutyltin oxide, dioctyltin dichloride, and the like. The catalysts are employed in small amounts, for example, from about 0.001 percent to about 5 percent based on weight of the reaction mixture.

The blowing agents useful in producing polyurethane foams in accordance with this invention include water and halogenated hydrocarbons such as trichloromonofluoromethane, dichlorodifluoromethane, dichloromonofluoromethane, dichloromethane, trichloromethane, 1,1-dichloro-1-fluroethane, 1,1,2-trichloro-1,2,2-trifluoromethane, hexafluorocyclobutane, octafluorocyclobutane, and the like. Another class of blowing agents include thermally unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoroemethane. The quantity of blowing agent employed will vary with factors such as the density desired in the foamed product.

The foam stabilizers useful in producing polyurethane foams in accordance with this invention include "hydrolyzable" polysiloxane-polyoxyalkylene block copolymers such as the block copolymers described in U.S. Pat. Nos. 2,834,748 and 2,917,480. Another useful class of foam stabilizers are the "non-hydrolyzable" polysiloxane-polyoxyalkylene block copolymers such as the block copolymers described in U.S. Pat. No. 3,505,377; U.S. patent application No. 888,067, filed Dec. 24, 1969 and British Pat. No. 1,220,471.

The extenders useful in producing microcellular polyurethane elastomers in accordance with this invention include aromatic polyamines and aromatic glycols. Illustrative of suitable hindered aromatic polyamines are 3-chloro-4,4'-diaminodiphenylmethane, 4,4'-methylene bis (2-chloroaniline), cumene diamine, toluene diamine, and dichlorobenzidine. Illustrative of the aromatic glycols are reaction products of alkylene oxides with aromatic amines or alcohols having two active hydrogens, especially reaction products of alkylene oxides with di[hydroxyalkoxyl] aryl compounds and primary amino aryl compounds. The preferred aromatic glycols are the reaction products of ethylene oxide and aniline. Other extenders that may be used include ethylene oxide and propylene oxide adducts of bisphenol A ("PLURACOL-P-245") or the propylene oxide adducts of aniline ("C-100"). Still other useful extenders are butane diol, ethylene glycol, diethylene glycol, propylene glycol, dipropylene glycol, etc.

Polyurethanes produced in accordance with this invention are useful in the applications in which polyurethanes made from conventional polymer/polyol compositions are employed. Indeed, the polyurethanes so produced may be utilized in foam and elastomer applications where any conventional type of polyurethane is, or can be, utilized.

The Examples which follow are intended to further illustrate the invention described herein and are not intended to limit the invention in any way.

DEFINITIONS

As used in the Examples appearing below, the following designations, symbols, terms and abbreviations have the indicated meanings.

| | |
|---|---|
| Polyol I | A polyether polyol produced by polymerizing propylene oxide with a glycerine starter to a hydroxyl number of about 40, stripping the product, and reacting it with about 15 weight percent ethylene oxide to reduce the hydroxyl number to about 34 to provide a nominal number average molecular weight of about 5,000. |
| Polymer Polyol I | A conventional polymer/polyol produced by polymerizing a 52/48 weight mixture of acrylonitrile and styrene in situ in Polyol I, the amount of acrylonitrile and styrene being 21 weight percent of the total weight of Polyol I, acrylonitrile, and styrene. |
| Catalyst I | A solution consisting of 70 weight percent bis(2-dimethylaminoethyl) ether and 30 weight percent dipropylene |

|  |  |
|---|---|
|  | -continued |
|  | glycol. |
| Catalyst II | A solution consisting of 33 weight percent triethylene diamine and 67 weight percent dipropylene glycol. |
| Catalyst III | A solution consisting of 33 weight percent 3-diethylamino-N,N-dimethylpropionamide and 67 weight percent $C_9H_{19}C_6H_4(OC_2H_4)_9OH$ |
| Silicone Surfactant I | Mixture of 86 weight percent Polyol I and 14 weight percent $Me_3SiO(Me_2SiO)_4(MeSiO)_{2.8}SiMe_3$<br>$\qquad\qquad\qquad \|$<br>$\qquad\qquad C_3H_6O(C_2H_4O)_3Me$ |
| Silicone Surfactant II | Mixture of 70 weight percent polyoxypropylene glycol; 10 weight percent $Me_3SiO(Me_2SiO)_{2.6}(MeSiO)_{1.4}SiMe;$<br>$\qquad\qquad\qquad \|$<br>$\qquad\qquad\qquad C_3H_6CN$<br>30 weight percent $Me_3SiO(Me_2SiO)_4(MeSiO_{2.8}SiMe;$<br>$\qquad\qquad\qquad \|$<br>$\qquad\qquad C_3H_6O(C_2H_4O)_3Me$ |
| Isocyanate I | A mixture of 80 weight percent of an 80/20 weight mixture of 2,4-tolylene diisocyanate and 2,6-tolylene diisocyanate, and 20 weight percent polymethylene polyphenylene isocyanate having a free NCO content of 31.5. |
| Isocyanate II | Glycerine plus 3 moles propylene oxide reacted with toluene diisocyanate to a free NCO content of 30 percent. |
| Extender | Average composition of the reaction product of 2.3 moles ethylene oxide with aniline. |
| VCN | Acrylonitrile |
| MVCN | Methacrylonitrile |
| S | Styrene |
| MA | Maleic anhydride |
| PETA | Pentaerythritol triacrylate |
| VAZO | Azo-bis-isobutyronitrile |
| EI | Ethylene imine |
| ILD | Indentation Load Deflection |
| CLD | Compression Load Deflection |
| pbw | parts by weight |
| rpm | revolutions per minute |
| % | percent |
| cps | centipoises |
| mg | milligrams |
| g | grams |
| wt | weight |
| in | inch |
| psig | pounds per square inch gauge |

TEST PROCEDURES

The following test procedures were employed in the Examples to determine the indicated properties.

POLYOL PROPERTIES

150 Mesh Seeds. A 470 gram sample is diluted with 940 grams of isopropanol to reduce viscosity effects. The diluted sample is passed through a 2.4 square inch "Standard Tyler" 150 mesh screen (average mesh opening 105 microns). The screen is washed with isopropanol, dried and weighed. The difference between the final and initial screen weight corresponds to the amount of polymer which did not pass through the screen and is reported as milligrams per 100 grams of polymer/polyol.

POLYURETHANE FOAM PROPERTIES

Mold Exit Time. The isocyanate is mixed with the polymer/polyol and other components of the polyurethane foam-forming composition at time $T_1$. The formulation is introduced into a preheated mold having vent holes at the top and the foam expands in the mold. At time $T_2$ foam begins to exit through the vent holes. Mold Exit Time is the time elapsed from $T_1$ to $T_2$.

Air Porosity. A polyurethane foam specimen 0.5 in. in thickness is compressed between two pieces of flanged plastic tubing having a 2.25 in. internal diameter. This assembly is then incorporated as a component in an air flow system. Air at a controlled velocity enters one end of the tubing, flows through the foam specimen, and exits through a restriction at the lower end of the assembly. The pressure drop across the foam due to the restriction of air passage is measured by means of an inclined closed manometer. One end of the manometer is connected to the upstream side of the foam and the other end to the downstream side. The flow of air on the upstream side is adjusted to maintain a differential pressure across the specimen of 0.1 inch of water. The air porosity of the foam is reported in units of air flow per unit area of specimen (cubic feet per minute per square foot).

The following properties of the polyurethane foams were determined in accordance with ASTM D2406:
Indentation Load Deflection (ILD)
Compression Set
Tensile Strength
Elongation
Tear Resistance
Load Resistance
Load Ratio
Resilience
Compression Load Deflection (CLD)
% Return The following ASTM procedures were employed to determine the indicated properties for the solid polyurethane elastomers:

| Hardness | D-2240 |
|---|---|
| Tensile Modulus | D-412 |
| Tensile Strength | D-412 |
| Elongation | D-412 |
| Die "C" Tear | D-624 |

EXAMPLES 1-26

A series of polymer/polyols were prepared by a semi-batch process. Examples C-1, C-2, and C-3, are comparative examples of polymer/polyols which were prepared without the use of any maleic anhydride in the monomer mixture.

In each Example, except Example 24, there were initially charged to a stirred, 5-liter reaction flask, 880 grams of Polyol I which was heated to 120° C. (initial charge of Polyol I in Example 24 being 968 grams). There were then fed to the flask, over a period of two hours, 646.4 grams (711.04 grams in Ex. 24) of a solution of 20 p.b.w. of monomer mixture, 0.4 p.b.w. of monomer mixture, 0.4 p.b.w. VAZO catalyst, and 20 p.b.w. Polyol I. The composition of the monomer mixture for each Example, in weight percent, is given in Table I. There were then added an additional 80 grams of Polyol I and 1.6 grams of VAZO over a period of one hour, while maintaining the temperature of the reactants at 120° C. (88 grams of Polyol I and 1.8 grams VAZO in Ex. 24). Volatiles were stripped for one hour in a rotary evaporator at a pressure of about 1 mm. Hg. The ethylene imine employed in Ex. 25 and 26 was post-added as 3.3 grams of a 20 weight percent solution of ethylene imine in Polyol I.

In Examples C-2, 6, 7, 10, C-3, and 13-23, the solution of Polyol I, monomer mixture, and VAZO were simply premixed in a feed tank and fed to the reaction flask.

The remaining Examples employed a method of feeding the monomers in which the concentrations of the various monomers in the feed stream varied during the reaction. The process employed to vary the monomer concentration in the feed stream was as is described in U.S. Pat. No. 3,804,881.

Examples 2-5, 8, 9, 11, 25, and 26 employed a feed tank and an auxiliary feed tank, the latter being referred to as "Tank I". The tanks were arranged such that Tank I fed into the feed tank, which in turn fed into the reaction vessel. The feed tank and Tank I were initially charged with the amounts of monomers, catalyst, and Polyol I which are indicated in Table I. Amounts are indicated in grams.

The feed from Tank I into the feed tank and the feed from the feed tank to the reaction vessel were commenced simultaneously. The feed rates were constant and were selected so that the feed tank and Tank I emptied simultaneously. Typically, the contents of Tank I were fed into the feed tank at a rate of 161.6 grams/hr.; and the contents of the feed tank were fed to the reaction vessel at a rate of 323.2 grams/hr. The feed tank was stirred so as to provide rapid mixing of the incoming feed from Tank I with the contents of the feed tank.

Examples C-1, 1, and 24 employed a variable monomer content feeding arrangement similar to that of 2-5, etc., except that two auxiliary feed tanks, Tank I and Tank II, were employed. The initial charges of material to the feed tank, Tank I, and Tank II, are given, in grams, also in Table I. The feed from Tank I to the feed tank was commenced simultaneously with the feed from the feed tank to the reaction vessel. The feed rate of Tank I was such that it was emptied after one hour. The feed from Tank II into the feed tank was then immediately commenced at a rate such that Tank II emptied at the same time as the feed tank.

In Example 24, there was fed to the reaction vessel from a dropping funnel, prior to beginning the feed from the feed tank, an initial feed mixture containing 25.6 grams acrylonitrile, 6.4 grams styrene, 0.64 grams VAZO, and 32 grams Polyol I. The initial feed took place over 15 minutes; thus, total feed time for Example 24 was 2:15 hours.

Example 12 employed a single auxiliary tank as in Examples 2-5, etc.;, however, the feed from Tank I into the feed tank was not begun until half the contents of the feed tank had been fed to the reaction vessel. The feed rate from Tank I into the feed tank was such that the two tanks emptied simultaneously. The parts by weight of the reactants is also set forth in Table I.

TABLE I

| | (reactants, parts by weight) | | | | | | | | |
|---|---|---|---|---|---|---|---|---|---|
| Example No. | 2 | 3 | 4 | 5 | 8 | 9 | 11 | 25 | 26 |
| Feed Tank | | | | | | | | | |
| VCN | — | — | 16 | 32 | 60 | 60 | 128 | — | 96 |
| MVCN | 96 | 92.8 | 80 | 64 | — | — | — | 96 | — |
| S | 64 | 64 | 64 | 64 | 60 | 60 | 32 | 64 | 64 |
| MA | — | — | — | — | — | — | — | — | — |
| PETA | — | 3.2 | — | — | — | — | — | — | — |
| VAZO | 3.2 | 3.2 | 3.2 | 3.2 | 2.4 | 2.4 | 3.2 | 3.2 | 3.2 |
| Polyol I | 160 | 160 | 160 | 160 | 200 | 200 | 160 | 160 | 160 |
| Tank I | | | | | | | | | |
| VCN | — | — | — | — | 60 | 60 | 112 | — | 144 |
| MVCN | 144 | 144 | 144 | 144 | — | — | — | 144 | — |
| S | — | — | — | — | 48 | 36 | 32 | — | — |
| MA | 16 | 16 | 16 | 16 | 12 | 24 | 16 | 16 | 16 |
| VAZO | 3.2 | 3.2 | 3.2 | 3.2 | 2.4 | 2.4 | 3.2 | 3.2 | 3.2 |
| Polyol I | 160 | 160 | 160 | 160 | 200 | 200 | 160 | 160 | 160 |

| Example No. | C-1 | 1 | 24 | 12 |
|---|---|---|---|---|
| Feed Tank | | | | |
| VCN | — | — | — | 192 |
| MVCN | 160 | 160 | 160 | — |
| S | — | — | — | 48 |
| VAZO | 3.2 | 3.2 | 3.2 | 4.8 |
| Polyol I | 160 | 160 | 160 | 240 |
| Tank I | | | | |
| VCN | — | — | — | 48 |
| MVCN | — | — | — | — |
| S | 80 | 80 | 80 | 16 |
| MA | — | — | — | 16 |
| VAZO | 1.6 | 1.6 | 1.6 | 1.6 |
| Polyol I | 80 | 80 | 80 | 80 |
| Tank II | | | | |
| VCN | — | — | — | (Inapplicable) |
| MVCN | 80 | 64 | 64 | |
| S | — | — | — | |
| MA | — | 16 | 16 | |
| VAZO | 1.6 | 1.6 | 1.6 | |
| Polyol I | 80 | 80 | 80 | |

The viscosity, filterability and other characteristics of the polymer/polyols so produced are set forth in Table II below.

TABLE II

| Example No. | C-1 | 1 | 2 | 3 | 4 | 5 | C-2 | 6 | 7 | 8 | 9 | 10 | 11 | 12 |
|---|---|---|---|---|---|---|---|---|---|---|---|---|---|---|
| Monomer Composition, % | | | | | | | | | | | | | | |
| VCN | — | — | — | — | 5 | 10 | 50 | 50 | 50 | 50 | 50 | 75 | 75 | 75 |
| MVCN | 75 | 70 | 75 | 74 | 70 | 65 | — | — | — | — | — | — | — | — |
| S | 25 | 25 | 20 | 20 | 20 | 20 | 50 | 45 | 40 | 45 | 40 | 20 | 20 | 20 |
| MA | — | 5 | 5 | 5 | 5 | 5 | — | 5 | 10 | 5 | 10 | 5 | 5 | 5 |
| PETA | — | — | — | 1 | — | — | — | — | — | — | — | — | — | — |
| EI | — | — | — | — | — | — | — | — | — | — | — | — | — | — |
| Brookfield Viscosity, cps | | | | | | | | | | | | | | |
| 60 rpm | 1470 | 1360 | 1470 | 1570 | 1610 | 1680 | 3160 | 2360 | 2460 | 7780 | 4220 | 2940 | 2920 | 2800 |
| 6 rpm | 1335 | 1270 | 1270 | 1410 | 1390 | 1520 | 2720 | 2500 | 2580 | 5040 | 3580 | 3380 | 3340 | 2760 |
| 150 Mesh Seeds (mg/100g) | 1.1 | 0.5 | 1.0 | 28.8 | 1.5 | 0.4 | 0.5 | 0.0 | 0.0 | 0.3 | 0.2 | 0.5 | 1.1 | 0.0 |
| Acid Number mgKOH/g | — | — | — | — | — | — | — | — | — | — | — | — | — | — |
| Polymer Content, Wt %* | 20 | | | | | | 15 | 15 | 20 | | | | | |

| Example No. | C-3 | 13 | 14 | 15 | 16 | 17 | 18 | 19 | 20 | 21 | 22 | 23 | 24 | 25 | 26 |
|---|---|---|---|---|---|---|---|---|---|---|---|---|---|---|---|
| Monomer Composition, % | | | | | | | | | | | | | | | |
| VCN | 80 | 80 | 75 | 75 | 50 | 45 | 50 | 40 | 50 | 46.9 | 80 | 76.9 | 7.3 | — | 75 |
| MVCN | — | — | — | — | — | — | — | — | — | — | — | — | 63.7 | 75 | — |
| S | 20 | 15 | 20 | 15 | 45 | 50 | 40 | 50 | 46.9 | 50 | 16.9 | 20 | 24.6 | 20 | 20 |
| MA | — | 5 | 5 | 10 | 5 | 5 | 10 | 10 | 3.1 | 3.1 | 3.1 | 3.1 | 4.5 | 5 | 5 |
| PETA | — | — | — | — | — | — | — | — | — | — | — | — | — | — | — |
| EI | — | — | — | — | — | — | — | — | — | — | — | — | — | 2.2 | 2.2 |
| Brookfield Viscosity, cps | | | | | | | | | | | | | | | |
| 60rpm | 2200 | 3300 | 3750 | — | 4680 | 4290 | 4540 | 3780 | 3950 | 4310 | 2780 | 2730 | Not Submitted For Evaluation | | |
| 6 rpm | 2260 | 3800 | 4200 | 7200 | 4580 | 4060 | 4580 | 3720 | 3920 | 4000 | 3400 | 3240 | | | |
| 150 Mesh Seeds (mg/KOHg) | 0.6 | 1.2 | 1.2 | 1.5 | 0.2 | 21.3 | 0.1 | 35.6 | 22.3 | 1.2 | 0.8 | 0.3 | — | — | — |
| Acid Number mgKOH/g | 0.009 | 1.562 | 1.403 | 3.455 | — | — | — | — | — | — | — | — | — | — | — |
| Polymer Content, Wt %* | 20 | | | | | | | | | | | | | | |

*Based on total Polymer/Polyol weight

As can be seen from Table II, by a comparison of control example C-1 with Example 1 and control C-2 with Examples 6 and 7, respectively, (the examples which are considered directly comparable) the polymer/polyols formed in accordance with the present invention have slightly lower viscosities and equivalent filterability characteristics in comparison to the polymer/polyol controls.

Also, the filterability characteristics of the polymer/polyols of Examples 13–15 and 22–23 compare satisfactorily with the polymer/polyol of C-3. The viscosity characteristics of these Examples are higher than that of the C-3 polymer/polyol but are considered to be within the same general range with the exception of the Example 15 polymer/polyol.

EXAMPLES 27–28

Using various polymer/polyols from the previous Examples and controls, a series of molded, high resiliency polyurethane foams were produced. Additionally, a molded polyurethane foam was prepared using Polymer/Polyol I, the conventional polymer/polyol previously described.

Each polyurethane foam was produced using one of two reactive formulations, identified as A and B in Table III.

TABLE III

FORMULATIONS FOR MOLDED, HIGH RESILIENCY FOAMS

| Components, parts by weight | A | B |
|---|---|---|
| Polyol I | 60 | 60 |
| Polymer-Polyol | 40 | 40 |
| Water | 2.6 | 2.6 |
| Catalyst I | 0.11 | 0.10 |
| Catalyst II | 0.33 | 0.36 |
| Catalyst III | 0.25 | 0.30 |
| Silicone Surfactant I | 1.5 | — |
| Silicone Surfactant II | — | 0.75 |
| Polyisocyanate Index | 105 | 105 |
| Tin Catalyst | .02 | .015 |

The molded polyurethane foams were prepared in the following manner. A mold (15 in. × 15 in. × 4.75 in.) was waxed with a mold release agent (Perma-Mold Release Agent 804-7 SH, supplied by Brulin) and heated to 170 to 200° F. in a dry air oven. Excess mold release agent was wiped off, and the mold was cooled to about 120° F. The polyisocyanate was weighed into one beaker, and the water and amine catalyst were weighed into a separate beaker. The polyols, tin catalyst and silicone surfactant were weighed into a 0.5 gallon carton and placed on a drill press. The polyol was mixed for 30 seconds with a 2.5-inch, 6-blade turbine at 400 r.p.m. The mixer was stopped, the water/amine mixture was added, and a mixing baffle was placed in the carton. Mixing was then resumed for 55 seconds, after which the polyisocyanate was added; mixing was still further resumed for another 5 seconds. The contents of the carton were poured into the heated mold. After 2 minutes the mold was placed in an oven at 250° F. for 6 minutes. The foam was then removed from the mold, crushed by hand, and passed through a roller 3 times. The properties of the foams were then determined, as set forth in Table IV. The humid aged foam properties set forth in Table IV were determined by placing the foam specimen in a steam autoclave for 5 hours at 120° C. at 12 to 16 p.s.i.g.; drying for 3 hours at 70° C. in a converted dry air oven; and equilibrating for 16 to 24 hours at 23° C. and 50% relative humidity.

Polyurethane foams could not be successfully prepared from the polymer-polyols of Examples 7 through 13 and 15 through 19 using standard formulations, presumably due to the apparently high acid members, believed responsible for the foam collapse. However, these polymer-polyols are considered suitable for use in the production of solid or microcellular polyurethane elastomers. Formulation modifications may also have obviated the collapse of these foams.

TABLE IV

| Example | K-1 | 27 | 28 | 29 |
|---|---|---|---|---|
| Polymer/Polyol (Example No.) | C-3 | 22 | 23 | 14 |
| Monomer Composition | | | | |
| Acrylonitrile | 80 | 80 | 76.9 | 75 |
| Styrene | 20 | 16.9 | 20 | 20 |
| Maleic Anhydride | — | 3.1 | 3.1 | 5 |
| Foam Formulation (Table III) | B | B | B | B |
| Foam Physical Properties | | | | |
| Density, overall, lb./ft$^3$ | 2.95 | 2.95 | 2.94 | 2.97 |
| core, lb./ft$^3$ | 2.69 | 2.78 | 2.78 | 2.68 |
| Air Porosity, ft$^3$/min/ft$^2$ | 5.1 | 45.5 | 48.3 | 14.2 |
| Resiliency, % ball rebound | 56 | 64 | 65 | 61 |
| ILD (lbs/50 in$^2$) | | | | |
| 25% | 38.5 | 41.8 | 41.9 | 44.9 |
| 65% | 102.0 | 108.0 | 107.5 | 115.0 |
| 25% Return, % | 81.8 | 81.2 | 81.4 | 83.5 |
| Load Ratio | 2.65 | 2.58 | 2.56 | 2.56 |
| 25%(a) | 39.1 | 42.9 | 42.8 | 45.4 |
| 65%(a) | 103.7 | 111.0 | 109.7 | 116.2 |
| Tensile Strength, psi | 23.5 | 18.8 | 21.1 | 22.3 |
| Elongation, % | 147 | 138 | 153 | 144 |
| Tear Resistance, pli | 1.81 | 1.63 | 1.52 | 1.91 |
| 75% Compression Set, $C_d$, % | 10.2 | 7.9 | 7.1 | 6.0 |
| Humid Aging (5 hrs at 120° C.) | | | | |
| 50% Compression Set, $C_d$, % | 25.6 | 24.2 | 22.5 | 20.3 |
| 50% CLD Load Loss, % | 28.1 | 23.1 | 25.5 | 36.0 |

| Example | K-2 | 30 | 31 | 32 |
|---|---|---|---|---|
| Polymer-Polyol (Example No.) | * | 20 | 21 | 6 |
| Monomer Composition | | | | |
| Acrylonitrile | 52 | 50 | 46.9 | 50 |
| Styrene | 48 | 46.9 | 50 | 45 |
| Maleic Anhydride | — | 3.1 | 3.1 | 5 |
| Foam Formulation (Table III) | B | B | B | B |
| Foam Physical Properties | | | | |
| Density, overall lb./ft$^3$ | 2.92 | 2.98 | 2.98 | 2.97 |
| core, lb./ft$^3$ | 2.57 | 2.77 | 2.82 | 2.81 |
| Air Porosity, ft$^3$/min/ft$^2$ | 10.6 | 45.5 | 43.3 | 42.5 |
| Resiliency, % ball rebound | 58 | 63 | 64 | 68 |
| ILD (lbs/50 in$^2$) | | | | |
| 25% | 37.7 | 43.2 | 43.0 | 42.1 |
| 65% | 96.4 | 109.2 | 110.0 | 108.3 |
| 25% Return, % | 81.5 81.0 | 80.7 | 82.9 | |
| Load Ratio | 2.56 | 2.53 | 2.56 | 2.57 |
| 25%(B) | 38.7 | 43.5 | 43.3 | 42.5 |
| 65%(B) | 99.0 | 109.9 | 110.7 | 109.4 |
| Tensile Strength, psi | 23.6 | 23.1 | 23.2 | 20.2 |
| Elongation, % | 163 | 154 | 146 | 132 |
| Tear Resistance, pli | 1.77 | 1.71 | 1.78 | 1.59 |
| 75% Compression Set, $C_d$,% | 10.5 | 7.8 | 8.6 | 7.5 |
| Humid Aging (5 hrs at 120°C.) | | | | |
| 50% Compression Set, $C_d$, % | 23.5 | 22.6 | 23.8 | 20.7 |
| 50% CLD Load Loss, % | 16.3 | 22.2 | 21.8 | 35.0 |

| Example | 33 | 34 | 35 | 36 |
|---|---|---|---|---|
| Polymer/Polyol (Example No.) | 2 | 3 | 4 | 5 |
| Monomer Composition | | | | |
| Methacrylonitrile | 75 | 74 | 70 | 65 |
| Styrene | 20 | 20 | 20 | 20 |
| Maleic Anhydride | 5 | 5 | 5 | 5 |
| Pentaerythritol Triacrylate | — | 1 | — | — |
| Acrylonitrile | — | — | 5 | 10 |
| Foam Formulation (Table II) | A | A | A | A |
| Foam Physical Properties | | | | |
| Density, overall, lb./ft$^3$ | 299 | 3.01 | 3.02 | 2.99 |
| core, lb./ft$^3$ | 2.76 | 2.60 | 2.58 | 2.61 |
| Air Porosity, ft$^3$/min/ft$^2$ | 34.0 | 26.1 | 23.0 | 26.7 |
| Resiliency, % ball rebound | 67 | 63 | 65 | 65 |
| ILD (lbs/50 in $^2$) | | | | |
| 25% | 38.7 | 42.0 | 41.0 | 38.7 |
| 65% | 103.0 | 106.2 | 106.3 | 106.5 |
| 25% Return, % | 84.5 | 83.1 | 83.9 | 83.5 |
| Load Ratio | 2.66 | 2.53 | 2.59 | 2.75 |
| 25%(c) | 38.8 | 41.9 | 40.7 | 38.8 |
| 65%(c) | 103.3 | 105.8 | 105.6 | 106.9 |
| Tensile Strength, psi | 21.8 | 22.5 | 21.3 | 22.4 |
| Elongation, % | 146 | 163 | 154 | 149 |
| Tear Resistance, pli | 1.77 | 1.97 | 1.94 | 1.92 |
| 75% Compression Set, $C_d$, % | 7.6 | 7.9 | 7.8 | 8.5 |
| Humid Aging (5 Hrs at 120° C.) | | | | |
| 50% Compression Set, $C_d$, % | 18.3 | 18.5 | 18.7 | 21.9 |
| 50% CLD Load Loss, % | 29.1 | 27.5 | 25.7 | 28.6 |

| Example | K-3 | 37 | K-4 | 38 |
|---|---|---|---|---|
| Polymer/Polyol (Example No.) | C-1 | 1 | C-1 | 1 |
| Monomer Composition | | | | |
| Methacrylonitrile | 75 | 70 | 75 | 70 |
| Styrene | 25 | 25 | 25 | 25 |
| Maleic Anhydride | — | 5 | — | 5 |
| Foam Formulation (Table III) | A | A | B | B |
| Foam Physical Properties | | | | |
| Density, overall, lb./ft$^3$ | 3.05 | 3.12 | 2.97 | 2.96 |
| core, lb./ft$^3$ | 2.38 | 2.57 | 2.57 | 2.53 |
| Air Porosity, ft$^3$/min/ft$^2$ | 7.7 | 7.9 | 23.5 | 17/2 |
| Resiliency, % ball rebound | 55 | 57 | 62 | 63 |
| ILD (lbs./50 in$^2$) | | | | |
| 25% | 38.0 | 53.4 | 41.9 | 49.0 |
| 65% | 88.0 | 115.0 | 96.0 | 111.5 |
| 25% Return, % | 83.9 | 83.1 | 84.7 | 85.1 |
| Load Ratio | 2.31 | 2.15 | 2.29 | 2.27 |
| 25%(b) | 37.4 | 51.3 | 42.3 | 49.7 |
| 65%(b) | 86.6 | 110.6 | 97.0 | 113.0 |
| Tensile Strength, psi | 17.4 | 14.4 | 21.9 | 18.0 |
| Elongation, % | 137 | 102 | 154 | 128 |
| Tear Resistance, pli | 1.86 | 1.62 | 1.83 | 1.79 |
| 75% Compression Set, $C_d$ % | 7.6 | 6.0 | 8.3 | 7.0 |
| Humid Aging (5 hrs at 120° C.) | | | | |
| 50% Compression Set, $C_d$, % | 18.3 | 14.7 | 19.1 | 18.1 |
| 50% CLD Load Loss, % | 27.3 | 27.1 | 29.1 | 31.5 |

*Polymer/Polyol I
(a) Normalized to 3.00 lb./ft$^3$ density.
(b) Normalized to 3.00-PCF density.
(c) Normalized to 3.00 lb/ft$^3$ overall density As can be seen from a comparison of Example K-1 (reporting a foam prepared from polymer/polyol control C-3) with Examples 27–29 (made from the polymer/polyols of Examples 22–23 and 14, respectively, the normalized 25% and 65% ILD values are significantly higher for the foams made from polymer/polyols in accordance with this invention. Similarly, the Compression Set values for these foams are superior, being significantly lower than the value for the K-1 control foam. These same improvements in load bearing capacities are evident from a comparison of Example K-3 (made from control polymer/polyol C-1 with formulation A) with the Example 37 foam and Example K-4 (made from control polymer/polyol C-1 with foam formulation B) with the Example 38 foam. The Compression Set values for the foams made in accordance with this invention are slightly better, but are probably not sufficiently lower than the value of the control foam so as to be truly significant. While the foam of Example K-2 is not strictly comparable with the foams of Examples 30–32 since a commercially available polymer/polyol was used, the tendency towards improved load-bearing and Compression Set characteristics is evident.

EXAMPLE 39

This Example illustrates the preparation of a polyurethane elastomer from a polymer/polyol in accordance with the present invention. The properties of the resulting elastomer were then compared to an elastomer formed from a control elastomer.

Hand cast, urethane elastomers were thus made from the monomer mixtures set forth in Table V as follows. The polymer/polyol, extender and tin catalyst (0.03 parts) were mixed in a reaction flask, the amounts of extender and polymer/polyol being set forth in Table V, consisting of a 500 ml., 4-necked, round-bottom flask equipped with mechanical stirrer, vacuum inlet stirrer, and heating mantle. The flask was attached to a vacuum pump and was degassed for about 20 minutes, the isocyanate to be used also being degassed. The required amount of isocyanate as also set forth in Table V hereinafter, was then added to the reaction flask, after the stirrer had been stopped and the vacuum broken. The vacuum is then reapplied, and the stirrer started. The mixture was stirred vigorously for about 15 seconds or somewhat more.

The vacuum was then broken, and the liquid elastomer system contained in the flask was poured between two glass plates coated with a Hysol mold release agent "AC-4368" (Dexter Corp.) and spaced apart by a polytetrafluoroethylene spacer to provide a gap of about ⅛ inch to facilitate pouring. The mold was clamped securely around its perimeter using the spring clamps and placed in an oven for curing.

The results are set forth in Table V, hereinafter. As seen, the elastomer made according to the present invention exhibits improved tensile modulus as well as tear.

TABLE V

| Polymer Polyol (Ex. No.) | C-1 | 1 |
|---|---|---|
| Monomer Composition | | |
| VCN | 75 | 70 |
| S | 25 | 25 |
| MA | — | 5 |
| Elastomer Components | Equivalent Ratio | |
| Polymer/Polyol | 1.0 | 1.0 |
| Polyol Extender | 1.0 | 1.0 |
| Isocyanate II | 2.1 | 2.1 |
| Elastomer Properties | | |
| Hardness, Shore A | 62 | 62 |
| 100% Tensile Modulus, p.s.i. | 287 | 303 |
| Tensile Strength, p.s.i. | 421 | 389 |
| Elongation, % | 137 | 122 |
| Tear, Die C, p.l.i. | 67 | 92 |

Thus, as has been seen, the present invention provides polymer/polyols which can be readily prepared and which impart improved parties to polyurethane products made therefrom without any accompanying substantial increase in viscosity of the polymer/polyol. Polyurethane foams exhibit improved load-bearing and compression set properties while elastomers possess improved tensile modulus and tear properties in comparison to conventional polymer/polyols.

What is claimed is:

1. A fluid, stable polymer/polyol which comprises: (1) from about 60 to about 90 weight percent of an organic polyol medium consisting essentially of at least one normally liquid polyol and (2) from about 10 to about 40 weight percent of an interpolymer of (a) a minor amount of polymerized ethylenically unsaturated dicarboxylic acid anhydride and (b) a major amount of at least one different polymerized ethylenically unsaturated monomer, said interpolymer being in the form of particles that are stably dispersed in the polyol and said weight percents being based on the total weight of the polymer and polyol.

2. The polymer/polyol of claim 1 wherein said polymerized ethylenically unsaturated dicarboxylic acid anhydride is present in an amount of from about 0.5 to about 20 weight percent based upon the total weight of the interpolymer.

3. The polymer/polyol of claim 2 wherein said polymerized ethylenically unsaturated dicarboxylic acid anhydride is present in an amount of from about 0.5 to about 10 weight percent.

4. The polymer/polyol of claim 2 wherein said polymerized ethylenically unsaturated dicarboxylic acid anhydride is present in an amount of from about 2.5 to about 6 weight percent.

5. The polymer/polyol of claim 1 wherein said ethylenically unsaturated dicarboxylic acid anhydride is maleic acid anhydride.

6. The polymer/polyol of claim 1 wherein said different polymerized ethylenically unsaturated monomer consists of acrylonitrile and styrene.

7. The polymer/polyol of claim 1 wherein said normally liquid polyol consists of a poly(oxypropylene) polyol.

8. The polymer/polyol of claim 1 wherein said polymer/polyol contains a seed level of less than about 20 mg/100 g polymer/polyol.

9. The polymer/polyol of claim 8 wherein the seed level is less than about 5 mg/100 g polymer/polyol.

10. A process for producing a fluid, stable polymer/polyol which comprises polymerizing, in the presence of a free radical catalyst, (1) from about 10 to about 40 weight percent of a monomer mixture of (a) a minor amount of an ethylenically unsaturated dicarboxylic acid anhydride and (b) a major amount of at least one different ethylenically unsaturated monomer, dispersed in (2) from about 60 to about 90 weight percent of an organic polyol medium consisting essentially of at least one normally liquid polyol, said weight percents of the monomer mixture and polyol medium being based on the total weight of the monomers and polyol medium.

11. The process of claim 10 wherein said ethylenically unsaturated dicarboxylic acid anhydride is present in an amount of from about 0.5 to about 20 weight percent, said weight being based on the total weight of said monomer mixture.

12. The process of claim 11 wherein said ethylenically unsaturated dicarboxylic acid anhydride is present in an amount of from about 0.5 to about 10 weight percent.

13. The process of claim 11 wherein said ethylenically unsaturated dicarboxylic acid anhydride is present in an amount of from about 2.5 to about 6 weight percent.

14. The process of claim 10 wherein said ethylenically unsaturated dicarboxylic acid anhydride is maleic anhydride.

15. The process of claim 10 wherein said different ethylenically unsaturated monomer consists of acrylonitrile and styrene.

16. A method for producing an elastomeric polyurethane which comprises reacting a mixture comprising: (a) a polymer/polyol composition as claimed in claim 1, and (b) an organic polyisocyanate in contact with (c) a catalyst for the reaction of (a) and (b) to produce a polyurethane.

17. The elastomeric polyurethane produced by the method of claim 16.

18. A method for producing a polyurethane foam which comprises reacting: (a) a polymer/polyol as claimed in claim 1, and (b) an organic polyisocyanate in contact with (c) a catalyst for the reaction of (a) and (b), (d) a blowing agent, and (e) a foam stabilizer.

19. The polyurethane foam produced by the method of claim 18.

* * * * *